United States Patent [19]

Scherbatskoy

[11] Patent Number: 4,839,870

[45] Date of Patent: Jun. 13, 1989

[54] PRESSURE PULSE GENERATOR SYSTEM FOR MEASURING WHILE DRILLING

[76] Inventor: Serge A. Scherbatskoy, 3921 Clayton Rd. E., Forth Worth, Tex. 76116

[21] Appl. No.: 206,942

[22] Filed: Jun. 3, 1988

Related U.S. Application Data

[60] Continuation of Ser. No. 75,848, Jul. 20, 1987, which is a continuation of Ser. No. 918,577, Oct. 10, 1986, abandoned, which is a continuation of Ser. No. 811,956, Dec. 20, 1985, abandoned, which is a continuation of Ser. No. 719,444, Apr. 2, 1985, abandoned, which is a continuation of Ser. No. 443,134, Nov. 19, 1982, abandoned, which is a division of Ser. No. 383,269, May 28, 1982, Pat. No. 4,520,468, which is a continuation of Ser. No. 68,526, Aug. 21, 1979, abandoned, and a continuation-in-part of Ser. No. 857,677, Dec. 5, 1977, abandoned.

[51] Int. Cl.$^4$ ............................................. G01V 1/40
[52] U.S. Cl. ........................................ 367/83; 367/85
[58] Field of Search ...................... 357/83, 85; 175/48, 175/50

[56] References Cited

U.S. PATENT DOCUMENTS

| | | | |
|---|---|---|---|
| 2,700,131 | 1/1955 | Otis et al. | 367/83 |
| 2,759,143 | 8/1956 | Arps | 367/83 |
| 3,435,224 | 3/1969 | Zemanek, Jr. | 340/861 |
| 3,711,825 | 1/1973 | Claycomb | 367/85 |
| 3,713,089 | 1/1923 | Claycomb | 367/84 |
| 3,736,558 | 5/1973 | Cubberly, Jr. | 367/85 |
| 3,964,556 | 6/1976 | Gearhert | 367/83 |
| 3,982,224 | 9/1976 | Patton | 367/84 |
| 3,983,948 | 10/1976 | Jeter | 367/83 |

Primary Examiner—Thomas H. Tarcza
Assistant Examiner—Ian J. Lobo
Attorney, Agent, or Firm—Head & Johnson

[57] ABSTRACT

A measurement while drilling apparatus for transmitting information carrying signals by fluid pressure changes in a borehole fluid circulation system having a flow restriction causing a high pressure zone and a low pressure zone, the apparatus having a passageway interconnecting the zones and a solenoid actuated valve interposed in the passageway, a sensor for sensing the magnitude of downhole measurements and for generating a succession of electric voltage changes indicative of the magnitude, a capacitor and a source of electric current for charging the capacitor, a circuit responsive to the sensor electric voltage changes for initiating successive discharges of the capacitor, which discharges are applied to the valve solenoid to produce successive openings and closings of the passageway thereby generating pressure changes in the borehole fluid circulation system.

8 Claims, 2 Drawing Sheets

PRESSURE PULSE GENERATOR SYSTEM FOR MEASURING WHILE DRILLING

This is a continuation application of copending application Ser. No. 075,848, filed July 20, 1987, which was a continuation of Ser. No. 918,577 filed Oct. 10, 1986, now abandoned, which was a continuation of application Ser. No. 811,956 filed Dec. 20, 1985, now abandoned, which was a continuation of application Ser. No. 719,444 filed Apr. 2, 1985 now abandoned, which was a continuation of application Ser. No. 443,134 filed Nov. 19, 1982, now abandoned, which was a divisional of application Ser. No. 383,269 filed May 28, 1982 which issued as U.S. Pat. No. 4,520,468 which was a continuation of Ser. No. 068,526 filed Aug. 21, 1979, now abandoned, which was a continuation-in-part of Ser. No. 857,677 filed Dec. 5, 1977, now abandoned.

FIELD OF THE INVENTION

This invention generally pertains to measurements while drilling a bore hole in the earth and more particularly pertains to systems, apparatus, and methods utilizing hydraulic shock waves in the drilling mud column for transmission of signals representing one or more downhole parameters to the earth's surface. It also pertains to systems and methods for detecting those signals in the presence of interfering noise.

DESCRIPTION OF THE PRIOR ART

This invention relates to data transmission systems for use in transmitting data from the bottom of a well bore to the surface while drilling the well.

It has been long recognized in the oil industry that the obtaining of data from downhole during the drilling of a well would provide valuable information which would be of interest to the drilling operator. Such information as the true weight on the bit, the inclination and the bearing of the borehole, the tool face, fluid pressure, and temperature at the bottom of the hole and the radioactivity of substances surrounding or being encountered by the drill bit would all be expressed by quantities of interest to the drilling operator. A number of prior art proposals to measure these quantities while drilling and to transmit these quantities to the surface of the earth have been made. Various transmission schemes have been proposed in the prior art for so doing. For a description of prior art see for instance U.S. Pat. No. 2,787,795 issued to J. J. Arps, U.S. Pat. No. 2,887,298 issued to H. D. Hampton, U.S. Pat. No. 4,078,620 issued to J. H. Westlake et al., U.S. Pat. No. 4,001,773 issued to A. E. Lamel et al., U.S. Pat. No. 3,964,556 issued to Marvin Gearhart et al., U.S. Pat. No. 3,983,948 issued to J. D. Jeter, and U.S. Pat. No. 3,791,043 issued to M. K. Russell. All of the above listed patents are incorporated in this specification by reference.

Perhaps the most promising of these prior art proposals in a practical sense has been that of signalling by pressure pulses in the drilling fluid. Various methods have been suggested in the prior art to produce such mud pulsations either by a controlled restriction of the mud flow circuit by a flow restricting valve appropriately positioned in the main mud stream or by means of a bypass valve interposed between the inside of the drill string (high pressure side) and the annulus around the drill string (low pressure side).

It has been suggested in the prior art to produce mud pressure pulses by means of valves that would either restrict the mud flow inside the drill string or bypass some flow to the low pressure zone in the annulus around the drill string. Such valves are of necessity slow because when used inside the drill string the valve must control very large mud volumes, and when used to control a by-pass, because of the very high pressure differences, the valve was of necessity also a slow motorized valve. For example, such a motorized valve, interposed between the inside of the drill string and the annulus produced in response to a subsurface measurement slow descreases and slow increases of mud pressure. These were subsequently detected at the surface of the earth.

$t_c^{(v)} = OC_1$ was the time at which the valve started to close;

$t_d^{(v)} = OD_1$ was the time at which the valve was fully closed.

The time interval:

$$T_a^{(v)} = t_b^{(v)} - t_a^{(v)} = t_d^{(v)} - t_c^{(v)} \qquad (2)$$

$T_a^{(v)}$ will be referred to as the "time of opening or closing of the valve". The time interval $$T_b^{(v)} = t_c^{(v)} - t_b^{(v)} \qquad (3)$$

$T_b^{(v)}$ will be referred to as the "time of open flow". Thus, the total period of the actuation of the valve was $$T_t^{(v)} = 2T_a^{(v)} + T_b^{(v)} \qquad (4)$$

In the above attempts one had $T_a^{(v)} = 1$ second, $T_b^{(v)} = 2$ seconds and consequently the total time of the actuation of the valve was $T_t^{(v)} = 4$ seconds. These relatively slow openings and closings of the valve produced correspondingly slow decreases and increases of mud pressure at the surface of the earth (see FIG. 1B).

It can be seen that the mud pressure decreased from its normal value of for example, 1000 psi (when the valve was closed) to its lowest value of 750 psi (when the valve was open). The times involved in these observed pressure variations were as follows:

$t_{1a}^{(s)} = OE_1$ was the time at which the mud pressure starts to decrease from its normal level at 1000 psi;

$t_{1b}^{(s)} = OF_1$ was the time at which the mud pressure attained its lowest level at 750 psi and was maintained at this level until time $t_{1c}^{(s)} = OG_1$;

$t_{1c}^{(s)} = OG_1$ was the time at which the mud pressure starts to increase;

$t_{1d}^{(s)} = OH_1$ was the time at which the mud pressure attained its normal level at 1000 psi.

Thus, the pressure decreased during the time interval $T_1^{(s)} = t_{1b}^{(s)} - t_{1a}^{(s)}$, then it remained constant during the interval $T_2^{(s)} = t_{1c}^{(s)} - t_{1b}^{(s)}$, and then it rose from its depressed value to the normal level during the time interval $T_3^{(s)} = t_{1d}^{(s)} - t_{1c}^{(s)}$. Thus, the total time of the mud flow through the bypass valve for a single actuation of the valve was $$T_t^{(s)} = T_1^{(s)} + T_2^{(s)} + T_3^{(s)} \qquad (5)$$

I have designated quantities in FIG. 1A (such as $t_a^{(v)}$, $t_b^{(v)}$, $t_c^{(v)}$, $t_d^{(v)}$, $T_a^{(v)}$, $T_b^{(v)}$ and $T_t^{(v)}$ with superscript "v" to indicate that these quantities relate to the operation of the valve which is below the surface of the earth. On the other hand the quantities $t_{1a}^{(s)}$, $t_{1b}^{(s)}$, $t_{1c}^{(s)}$, $t_{1d}^{(s)}$, $T_1^{(s)}$, $T_2^{(s)}$, $T_3^{(s)}$ and $T_t^{(s)}$ in FIG. 1B are designated with superscript "s" to indicate that these quantities relate to measurements at the surface of the earth. This distinction between the quantities provided with superscript "v" and those with superscript "s" is essential in order to fully understand some of the novel features of my invention. It is essential in this connection to distinguish between the cause and the effect, or in other words, between the phenomena occurring downhole, in the proximity of the valve and those at the detector at the surface of the earth.

The regime of slow pressure variation as suggested in the prior art was not suitable for telemetering in measurement while drilling operations, particularly when several down hole parameters are being measured. By the time a first parameter has been measured, encoded, transmitted to the surface and then decoded, the well bore can have been deepened and the second parameter may no longer be available for measurement. Relatively long time intervals were required for the conversion of the measured data into a form suitable for detection and recording. The entire logging process was lengthy and time consuming. Furthermore various interfering effects such as pulsations due to the mud pump and noise associated with various drilling operations produced additional difficulty. A slow acting motorized valve, such as that suggested in the prior art, is believed to be inadequate to satisfy current commercial requirements.

SUMMARY OF THE INVENTION

Some of the objectives of my invention are accomplished by using hydraulic shock waves for telemetering logging information while drilling is in process. These shock waves are produced by a very rapidly acting (for all practical purposes almost instantaneously acting) bypass valve interposed between the inside of the drill string and the annulus around the drill string. When the bypass valve suddenly opens, the pressure in the immediate vicinity of the valve drops and then returns to normal almost instantaneously and a sharp negative pulse is generated, and conversely, when the bypass valve suddenly closes, a sharp positive pulse is generated. Elasticity of mud column is employed to assist in the generation and transmission of such shock waves. The phenomenon is analogous to the well known water hammer effect previously encountered in hydraulic transmission systems. (See for instance John Parmakian on "Water Hammer Analysis", Prentice Hall, Inc., New York, N.Y. 1955 or V. L. Streeter and E. B. Wylie on "Hydraulic Transients" McGraw-Hill Book Co., New York, N.Y.)

By providing a regime of hydraulic shock waves, I obtained a telemetering system by means of which large amounts of information can be transmitted per unit of time. Such a system is considerably better adapted to satisfy current commercial requirements than the one which is based on the regime of slow variations of pressure.

The valve, in accordance with my invention, is operated by the output of one or more sensors for sensing one or more downhole parameters in the earth's subsurface near the drill bit. One single measurement of each parameter is represented, by a succession of valve wavelets. Each valve wavelet corresponds to a single opening and closing of the valve.

The novel features of my invention are set forth with particularity in the appended claims. The invention both as to its organization and manner of operation with further objectives and advantages thereof, may best be presented by way of illustration and examples of embodiments thereof when taken in conjunction with the accompanying drawings.

FIG. 1 schematically and generally illustrates a well drilling system equipped to simultaneously drill and to make measurements in accordance with some aspects my invention.

It should be noted that identical reference numerals have been applied to similar elements shown in some of the above figures. In such cases the description and functions of these elements will not be restated in so far as it is unneccessary to explain the operation of these embodiments.

DESCRIPTION OF THE PREFERRED EMBODIMENTS

I. General Description of Apparatus for Data Transmission While Drilling

Figure 1:
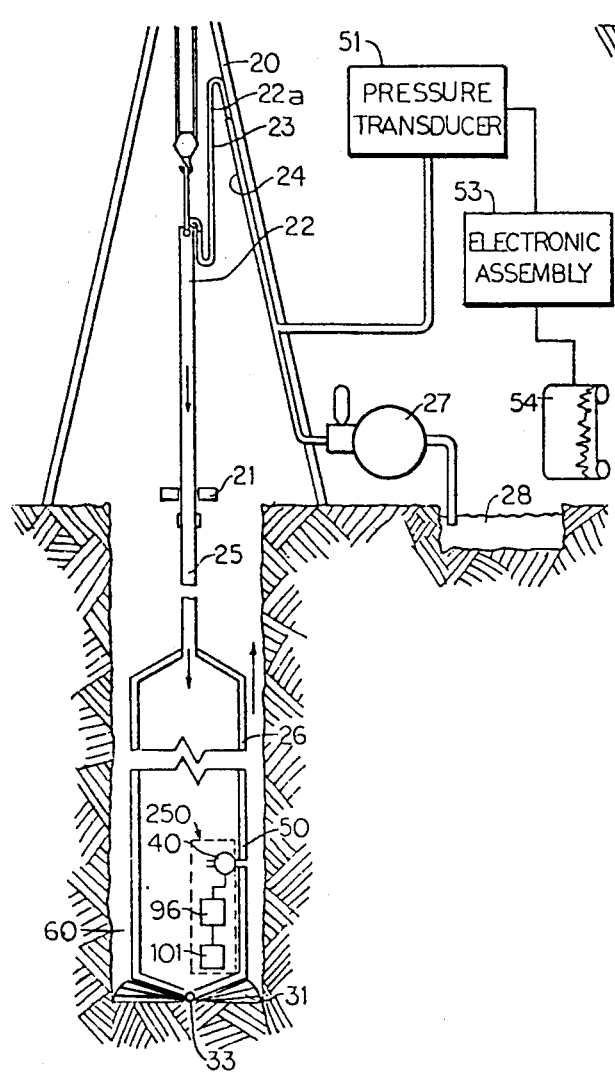

FIG. 1 illustrates a typical layout of a system embodying the principles of this invention. Numeral 20 indicates a standard oil well drilling derrick with a rotary table 21, a kelly 22, hose 23, and standpipe 24, drill pipe 25, and drill collar 26. A mud pump or pumps 27 and mud pit 28 are connected in a conventional manner and provide drilling mud under pressure to the standpipe. The high pressure mud is pumped down the drill string through the drill pipe 25 and the standard drill collars 26 and then through the special telemetry tool 50 and to the drill bit 31. The drill bit 31 is provided with the usual drilling jet devices shown diagramatically by 33. The diameters of the collars 26 and the telemetry tool 50 have been shown large and out of proportion to those of the drill pipe 25 in order to more clearly illustrate the mechanisms. The drilling mud circulates downwardly through the drill string as shown by the arrows and then upwardly through the annulus between the drill pipe and the wall of the well bore. Upon reaching the surface, the mud is discharged back into the mud pit (by pipes not shown) where cuttings of rock and other well debris are allowed to settle and to be further filtered before the mud is again picked up and recirculated by the mud pump.

Interposed between the bit 33 and the drill collar 26 is the special telemetering transmitter assembly or telemetry tool designated by numeral 50. This special telemetering transmitter assembly 50 includes a housing 250 which contains a valve assembly, or simply a valve 40, an electronic processing assembly 96, and sensors 101. The valve 40 is designed to momentarily by-pass some of the mud from the inside of the drill collar into the annulus 60. Normally (when the valve 40 is closed) the drilling mud must all be driven through the jets 33, and consequently considerable mud pressure (of the order of 2000 to 3000 psi) is present at the standpipe 24. When the valve 40 is opened at the command of a sensor 101 and electronic processing assembly 96, some mud is bypassed, the total resistance to flow is momentarily decreased, and a pressure change can be detected at the standpipe 24. The electronic processing assembly 96 generates a coded sequence of electric pulses representative of the parameter being measured by a selected sensor 101, and corresponding openings and closings of the valve 40 are produced with the consequent corresponding pressure pulses at the standpipe 24.

Numeral 51 designates a pressure transducer that generates electric voltage representative of the pressure changes in the standpipe 24. The signal representative of these pressure changes is processed by electronic assembly 53, which generates signals suitable for recording on recorder 54 or on any other display apparatus. The chart of recorder 54 is driven by a drive representative of the depth of the bit by means well known (not illustrated).

II. General Description of Special Telemetering Transmitter

Figure 2:
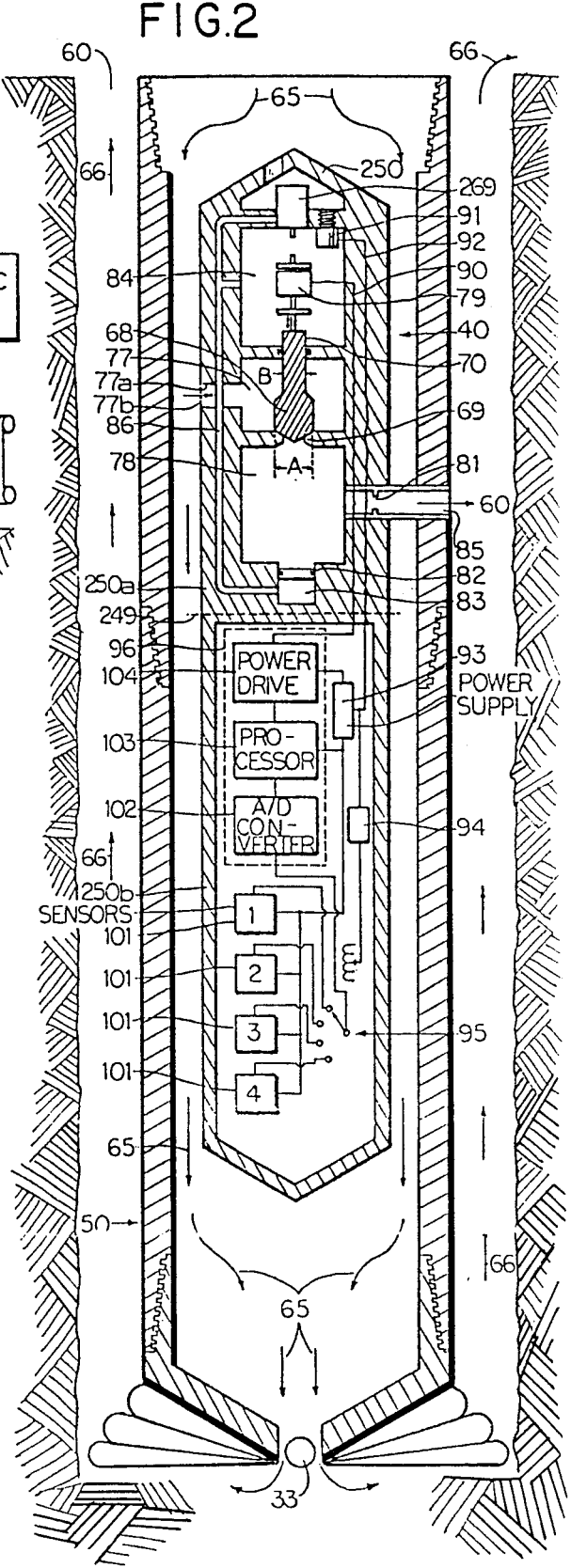
FIG. 2 shows schematically a portion of the subsurface equipment including a special telemetry tool in accordance with my invention.

FIG. 2 shows certain details of the special telemetering transmitter 50. Certain of these and other details have also been described in the above referred to co-pending application Ser. No. 857,677 filed by S. A. Scherbatskoy now abandoned, of which this application is a division of continuation in part. FIG. 2 is diagrammatic in nature. In an actual tool, the housing 250, which contains the valve 40, the electronic processing assembly 96, and the sensors 101, is divided into two sections 250a and 250b. The upper portion 250a (above the dottd line 249) contains the valve assembly 40 and associated mechanisms and, as will be pointed out later in the specification, is of substantially larger diameter than 250b. The lower section 250b (below the dotted line 249) contains the electronic processing assembly 96, sensors 101, and associated mechanisms, and as will be explained later in the specification, has a substantially smaller diameter than the upper section 250a. As shown in FIG. 2, the drilling mud circulates past the special telemetry tool 250a, 250b downwardly (as shown by the arrows 65) through the bit nozzle 33 and then back (as shown by the arrows 66) to the surface in annulus 60 and to the mud pit 28 by pipe means not shown. The valve assembly 40 comprises valve stem 68 and valve seat 69. The valve stem and seat are constructed in such manner that the cross sectional area of the closure A is slightly larger than the cross sectional area B of the compensating piston 70. Thus, when the pressure in chamber 77 is greater than that in the chamber 78, the valve stem 68 is forced downwardly; and the valve 40 tends to close itself more tightly as increased differential pressure is applied.

The fluid (mud) pressure in chamber 77 is at all times substantially equal to the fluid (mud) pressure inside the drill collar, designated as 26 in FIG. 1 and 50 in FIG. 2, because of the opening 77a in the wall of the assembly 250. A fluid filter 77b is interposed in passageway 77a in order to prevent solid particles and debris from entering chamber 77. When the valve 40 is closed, the fluid (mud) pressure in chamber 78 is equal to the fluid (mud) pressure in the annulus 60. When the valve 40 is open and the pumps are running mud flow occurs from chamber 77 to chamber 78 and through orifice 81 to the annulus 60 with corresponding pressure drops.

Double acting electromagnetic solenoid 79 is arranged to open or close valve 40 in response to electric current supplied by electric wire leads 90.

Let $P_{60}$ indicate the mud pressure in the annulus 60, $P_{77}$ the pressure in chamber 77, and $P_{78}$ the pressure in chamber 78. Then, when valve 40 is closed, one has $P_{78}=P_{60}$. When the pumps 27 are running and valve 40 is "closed", or nearly closed, and $P_{77}>P_{78}$ the valve stem 68 is urged towards the valve seat 69. When valve 40 is in the "open" condition (i.e., moved upwardly in the drawing) flow of mud from chamber 77 to the annulus 60 results; and because of the resistance to flow of the orifice 81 (FIG. 2), one has the relationship $P_{77}$ $P_{78}>P_{60}$. Chambers 83 and 84 are filled with a very low viscosity oil (such as DOW CORNING 200 FLUID, preferably of viscosity 5 centistokes or less) and interconnected by passageway 86. Floating piston 82 causes the pressure $P_{83}$ in the oil filled chamber 83 to be equal at all times to $P_{78}$. Thus, at all times $P_{78}=P_{83}=P_{84}$. Therefore, when the valve 40 is "open", since $P_{78}=P_{84}$ and $P_{77}>P_{84}$, the valve 40 is urged towards the "open" position by a force $F=(\text{area B})(P_{77}-P_{84})$. The valve 40 can therefore be termed bistable; i.e., when "open" it tends to remain "open" and when "closed" it tends to remain "closed". Furthermore, when nearly open it tends to travel to the open condition and when nearly closed, it tends to travel to the closed condition. The valve 40 can therefore be "flipped" from one state to the other with relatively little energy. The valve action can be considered the mechanical equivalent of the electric bi-stable flip-flop well known in the electronics art.

Figure 3:
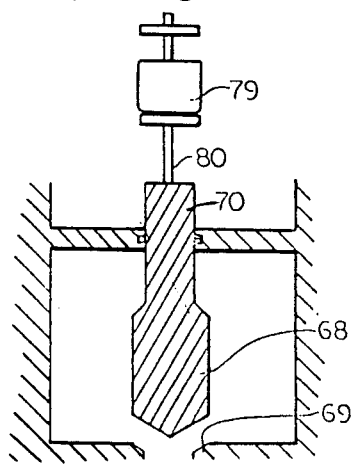
FIG. 3 shows schematically a portion of the arrangement of FIG. 2.

FIG. 3 shows the valve 40 in the open condition; whereas, in FIG. 2 it is closed.

Referring again to FIG. 2, numeral 91 indicates an electric "pressure switch" which is electrically conductive when $P_{77}>P_{78}$ (pump running) and electrically non-conductive when $P_{77}=P_{78}$ (pumps shut down—not running). Wire 92 running from pressure switch 91 to power supply 93 can, therefore, turn the power on or off. Also, by means of electronic counter 94 and electromagnetic sequence switch 95, any one of the four sensors 101 can be operatively connected to the electronic processing assembly 96 by sequentially stopping and running the mud pumps 27 or by stopping then running the pumps in accordance with a predetermined code that can be interpreted by circuitry in element 94.

III. Description of Electronic Processing Assembly Portion of Special Telemetry Tool We have described the operation of the bi-stable valve 40 and the sequence switch 95 which makes the selective electrical connection of the various sensors 101 to the electronic processing assembly 96.

Figure 4:
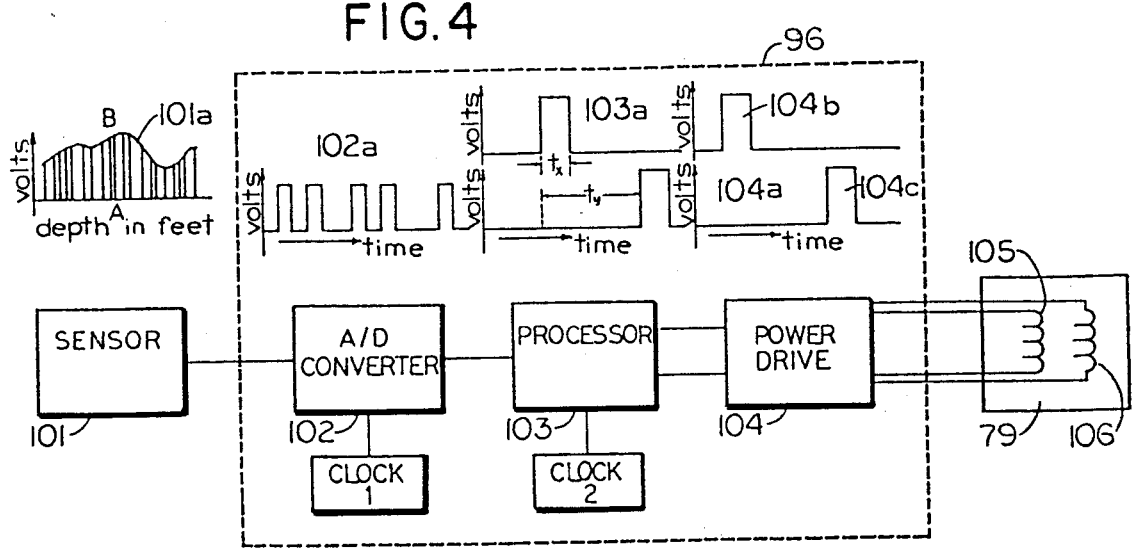
FIG. 4 shows, schematically and more in detail, the electronic processing assembly comprised within the dotted rectangle in FIG. 2.

For further details of the electronic processing assembly 96 reference is made to FIG. 4, where like numbers refer to like numbers of FIG. 2.

Various types of sensors that generate electric signals indicative of a downhole parameter are well known. Examples are gamma ray sensors, temperature sensors, pressure sensors, gas content sensors, magnetic compasses, strain gauge inclinometers, magnetometers, gyro compasses, and many others. For the illustrative example of FIG. 4, I have chosen a gamma ray sensor such as an ionization chamber or geiger counter or scintillation counter (with appropriate electronic circuitry). All these can be arranged to generate a DC voltage proportional to the gamma ray flux which is intercepted by the sensor.

It is understood that the switching from one type sensor to another as accomplished by switch mechanism 95 of FIG. 2 is well within the state of the art, (electronic switching rather than the mechanical switch shown is preferable in most cases). Consequently, in FIG. 4 for reasons of clarity of description, only a single sensor 101 has been shown. Also, the power supply 93 and mud pressure actuated switch 91 of FIG. 2 are not illustrated in FIG. 5A.

In FIG. 2, the sensor 101 is connected in cascade to A/D convertor 102, processor 103, and power drive 104. The power drive 104 is connected to windings 105 and 106 of the double acting solenoid designated as solenoid 79 in FIG. 2. The power drive 104 may be similar to that shown by FIG. 3E of the parent application. The operation is as follows: the sensor 101 generates an output electric analog signal as represented by the curve 101a shown on the graph immediately above the sensor rectangle 101. The curve shows the sensor output as a function of the depth of the telemetering transmitter 50 in the borehole. The A/D converter converts the analog signal of 101 into digital form by measuring in succession the magnitude of a large number of ordinates of curve 101a and translating each individual ordinate into a binary number represented by a binary word. This process is well known in the art and requires no explanation here. It is important, however, to realize that whereas graph 101a may represent the variation of the signal from the transducer in a matter of hours, the graph 102a represents one single ordinate (for example, AB of the curve 101a). Thus, the time scale of the axis of absissas on graph 102a would be in seconds of time and the whole graph 102a represents one binary 12 bit word, and in actuality represents the decimal number 2649. Thus, each 12 bit word on graph 102a represents a single ordinate such as the ordinate AB on the graph 101a. The usual binary coding involves time pauses between each binary word. After the pause a start up or precursor pulse is transmitted to indicate the beginning of the time interval assigned to the binary word. This precursor pulse is not part of the binary word but serves to indicate that a binary word is about to commense. The binary word is then transmitted which is an indication of the value of an ordinate on graph 101a; then a pause (in time) followed by the next binary word representing the magnitude of the next ordinate, and so on, in quick succession. The continuous curve of graph 101a is thus represented by a series of binary numbers or words each representing a single point on the graph 101a. It is important to understand here that between each binary word there is always a pause in time. This pause (during which no signals are transmitted) is frequently several binary words long, and the pause will be employed for an important purpose which will be explained later in the specification. In order to permit decoding at the surface, the clock No. 1 must be rigorously constant (and in synchronism with 9 corresponding clock located at the surface), and it generates a series of equally timed spaced pulses in a manner well known in the art of electronics.

The graph 103a represents a single bit of the binary word 102a, and the axis of abcissas here again is quite different from the previous graphs. The time on graph 103a is expressed in milliseconds since graph represents only a single bit. Each single bit is translated into two electric pulses each of time duration $t_x$ and separated by a time interval $t_y$. Graph 104a is a replica of 103a, which has been very much amplified by the power drive 104. Electric impulse 104b is applied to solenoid winding 105 (which is the valve "open" winding), and electric impulse 104c is applied to solenoid winding 106 (which is the valve "close" winding). The valve 40 of FIG. 2 thus is opened by pulse 104b and closed by pulse 104c and, therefore, the valve 40 remains in the "open" condition for approximately the time $t_y$. The times $t_x$ are adjusted to be proper for correct actuation of the solenoid windings and the time $t_y$ is proportioned to open the valve 40 for the correct length of time. Both of these times are determined and controlled by the clock #2.

In telemetering information from a sensor to the earth's surface, I provide appropriate pauses between transmission of successive binary words. Because of these pauses, it is possible to store in an appropriate electronic memory at the surface equipment the noise caused by the drilling operation alone (without the wavelet). The necessary arrangements and procedures for doing this will be described later in this specification.

IV. Description of Power Supply for Special Telemetering Transmitter

As was pointed out previously, the valve 40 of FIG. 2 must be very fast acting, and to drive it fast requires considerable power. (It has been determined as a result of appropriate testing that such a valve requires about $\frac{1}{2}$ to $\frac{3}{4}$ horsepower to operate at the necessary speed).

Although this power is very substantial, it is applied only very briefly, and consequently requires only small energy per operation.

In actual operation during tests, it was found that $\frac{1}{2}$ horsepower applied for about 40 milliseconds provided the required energy to produce a satisfactory single valve actuation. This energy can be calculated to be about 15 Joules. A battery pack can provide approximately 4 million Joules, without requiring recharge or replacement. The system is therefore capable of generating 130,000 complete valve operations (open plus close). In actuality the energy consumption is less than 15 Joules per operation. The inductance, the Q, and the motional impedance of the solenoid winding cause the current build up to be relatively slow. Thus the total energy per pulse is substantially less than 15 Joules and has been measured at 9 Joules thus providing a capability of 216,000 complete valve actuations. From the above, it can be seen that providing the necessary downhole energy from batteries for a practical telemetry tool is quite feasible. Providing the necessary very large power ($\frac{1}{2}$ horsepower), however, presents difficult problems.

It was clear that the solution to such a problem would involve the storage of energy in a mechanism that could be caused to release it suddenly (in a short time) and thus provide the necessary short bursts of high power. One such mechanism was "hammer action" which was utilized in the tool disclosed in my co-pending application, but which has been found to be sometimes insufficient. Other mechanisms considered early were the use of compressed air, compressed springs and others. Capacitor energy storage systems required large values of capacitance: The energy stored in a capacitor varies as the first power of the capacitance and as the square of the stored voltage, and since low inductance, fast acting, solenoid drive windings are required, the necessity of low voltage devices becomes apparent, initial calculation indicated that unduly large capacitors would be required.

After further evaluation, it appeared that an operable system might be feasible. By mathematical analysis and by experiments and tests it was determined that a set of optimum circuit parameters would be as follows:

1. Inductance of solenoid winding: 0.1 henrys when in the actuated position and 0.07 henrys when in the non-actuated position (i.e., a tapered armature solenoid).

2. Resistance of solenoid winding: 4.5 ohms.
3. Voltage at which energy is stored: 50 volts.
4. Magnitude of storage capacitor: 10,000 mfd.
5. Currrent capability of drive circuit: 10 amperes.

It was determined that in order to have fast solenoid action, low inductance windings are desirable. It was also determined that current capabilities of electronic drive circuits can be increased well beyond 10 amperes. Low voltage, however, requires unduly large values of capacitance.

Recent advances in so called molten salt batteries have produced energy sources of very good compactness. The same recent technology has also developed capacitors of extraordinarily high values, 10 farads in as little space as 1 cubic inch. These were unacceptable because the required heating to a high temperature (500° C.) which was deemed impractical; and the cost was prohibitive. Consequently, still further efforts were required. Following a thorough and lengthy investigation, finally it was discovered that a tantalum slug capacitor made in accordance with the latest developments would meet the specifications if the other parameters and factors outlined above were optimized to match the characteristics of such capacitors.

From the above it can be seen that at least 216,000 complete valve operations can be realized from one battery charge. Assuming that the telemetry system can provide adequate continuous data by transmitting five pulses per minute, the system is capable of operating continuously in a bore hole for a period of 440 hours. It must be pointed out however that continuous operation is often not necessary. The tool can be used only intermittently on command by the circuitry controlled by switch 91 and elements 94 and 95 of FIG. 2.

There is another parameter to be determined: the proper recharging of the capacitor after discharge. The capacitor can be charged through a resistor connected to the battery, (or other energy source) but this sometimes proved to be slow because as the capacitor became partially charged, the current through the resistor diminished, and at the end of the charge cycle, the charging current approached zero. If the ohmic valve of the resistor is made small, the batteries would be required to carry excessive momentary current because the initial current surge during the charging cycle would exceed the value for maximum battery life. The best method is to charge the capacitor through a constant current device. The capacitor would then be charged at an optimum charging current corresponding to the optimum discharge current for the particular type of battery for maximum energy storage. By correctly determining the charging current, a substantial increase (sometimes a factor of 2 or 3) in the amount of energy that is available from a given battery type can be achieved. Constant current devices are well known and readily available electronic integrated circuits, and are available for a wide range of current values.

Figure 5:
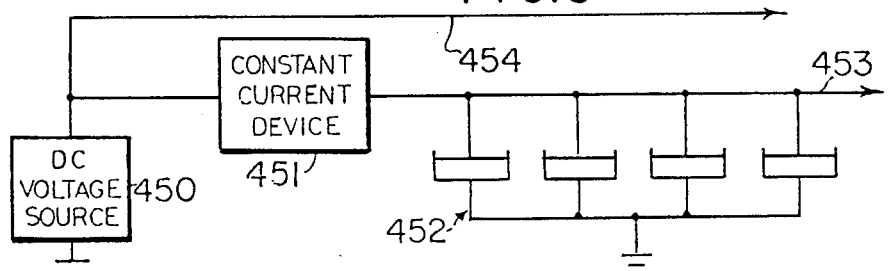
FIG. 5 shows schematically a power supply including a capacitor charging and discharging arrangement for providing the required power and energy for actuating the valve of the special telemetry tool.

FIG. 5 shows schematically a power supply which may be incorporated in the power drive 104 of FIG. 4A including a capacitor charging and discharging arrangement for providing the required power and energy for the windings of solenoid 79. In FIG. 5B, 450 indicates a battery or turbo generator or other source of direct current electric potential, 451 the contant current device, and 452 the capacitor. The capacitor is charged through the constant current device 451 and discharged via lead 453. The lead 454 provides the regular steady power required for the balance of the downhole electronics.

What is claimed is:

1. A measurement while drilling apparatus for use in a borehole in which information carrying signals are transmitted by fluid pressure changes in a borehole fluid circulation system employing a pump for forcing fluid flow through said system, a flow restriction in said system causing a well fluid high pressure zone and a fluid low pressure zone in different sides of said restriction, a passageway interconnecting said zones and a power driven valve interposed in said passageway, the openings and closings of said valve causing openings and closings of said passageway, the amount of power required for each opening of said valve exceeding a determined magnitude, a sensor for sensing the magnitude of downhole measurements and generating a succession of electric voltage changes to sequentially cause openings and closings of said valve in response to said downhole measurements, said apparatus comprising:

a valve opening means to actuate said valve to cause openings of said passageway; and a power drive comprising a capacitor means and a source of electrical voltage to supply electric current for charging said capacitor means;

said power drive being responsive to said electric voltage changes for initiating successive discharges of said capacitor means thus delivering an amount of power exceeding said magnitude with each of said discharges and applying said discharges to said valve opening means to produce successive openings of said passageway;

a valve closing means to actuate said valve to cause a closing of said passageway subsequently to each opening of said passageway whereby successive openings and closings of said passageway are produced;

said successive openings and closings of said passageway generating said pressure changes in said borehole fluid circulation system.

2. The apparatus of claim 1 wherein a means is provided for controlling the electric current supplied by said source to said capacitor means.

3. The apparatus of claim 2 wherein said controlling means is a constant current device.

4. The apparatus of claim 1 wherein said amount of power exceeds ½ horsepower.

5. A measurement while drilling apparatus for in a borehole in which information carrying signals are transmitted by fluid pressure changes in a borehole fluid circulation system employing a pump for forcing fluid flow through said system, a flow restriction in said system causing a well fluid high pressure zone and a fluid low pressure zone in different sides of said restriction, a passageway interconnecting said zones and a power driven valve interposed in said passageway, the openings and closings of said valve causing openings and closings of said passageway, the amount of power required for each closing of said valve exceeding a determined magnitude, a sensor for sensing the magnitude of downhole measurements and generating a succession of electric voltage changes to sequentially cause openings and closings of said valve in response to said downhole measurements;

said apparatus comprising:

a valve closing means to actuate said valve to cause closings of said passageway; and a power drive comprising a capacitor means and a source of electrical voltage to supply electric current for charging said capacitor means;

said power drive being responsive to said electric voltage changes for initiating successive discharges of said capacitor means thus delivering an amount of power exceeding said magnitude with each of said discharges and applying said discharges to said valve closing means to produce successive closings of said passageway;

a valve opening means to actuate said valve to cause an opening of said passageway subsequently to each closing of said passageway whereby successive openings and closings of said passageway are produced;

said successive openings and closings of said passageway generating said pressure changes in said borehole fluid circulation system.

6. The apparatus of claim 5 wherein a means is provided for controlling the electric current supplied by said source to said capacitor means.

7. The apparatus of claim 6 wherein said controlling means is a constant current device.

8. The apparatus of claim 5 wherein said amount of power exceeds ½ horsepower.

* * * * *